United States Patent
Stinnett

(10) Patent No.: US 10,475,344 B2
(45) Date of Patent: Nov. 12, 2019

(54) SYSTEMS AND METHODS FOR ADAPTIVE FILTERING OF VEHICLE-TO-VEHICLE MESSAGES FROM REMOTE VEHICLES

(71) Applicants: DENSO International America, Inc., Southfield, MI (US); DENSO CORPORATION, Kariya, Aichi-pref. (JP)

(72) Inventor: Joe Stinnett, Carlsbad, CA (US)

(73) Assignees: DENSO International America, Inc., Southfield, MI (US); DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 16/045,588

(22) Filed: Jul. 25, 2018

(65) Prior Publication Data
US 2019/0043357 A1 Feb. 7, 2019

Related U.S. Application Data

(60) Provisional application No. 62/539,605, filed on Aug. 1, 2017.

(51) Int. Cl.
*G08G 1/16* (2006.01)
*H04L 12/865* (2013.01)
(Continued)

(52) U.S. Cl.
CPC ......... *G08G 1/162* (2013.01); *B60W 50/0098* (2013.01); *G08G 1/012* (2013.01);
(Continued)

(58) Field of Classification Search
CPC ...... G08G 1/162; G08G 1/0116; G08G 1/012; G08G 1/0141; G08G 1/0965; G08G 1/166;
(Continued)

(56) References Cited

U.S. PATENT DOCUMENTS

| | | | |
|---|---|---|---|
| 8,718,797 B1* | 5/2014 | Addepalli | H04W 4/046 700/17 |
| 2008/0209137 A1* | 8/2008 | Chen | G06F 13/387 711/151 |

(Continued)

*Primary Examiner* — Mohamed Barakat
(74) *Attorney, Agent, or Firm* — Harness, Dickey & Pierce, P.L.C.

(57) ABSTRACT

Communication systems and methods for a vehicle are provided and include a memory storing a high priority queue and a low priority queue, the high priority queue storing first communication messages from first remote vehicles and the low priority queue storing second communication messages from second remote vehicles. A controller receives a communication message from a remote vehicle, applies a filter criteria to the communication message from the remote vehicle, and stores the communication message in one of the high priority queue or the low priority queue based on applying the filter criteria. The controller processes and decodes the first communication messages in the high priority queue at a first processing rate and processes and decodes the second communication messages in the low priority queue at a second processing rate. The first processing rate is higher than the second processing rate.

20 Claims, 8 Drawing Sheets

(51) Int. Cl.
  *H04W 4/46*    (2018.01)
  *G08G 1/0965*  (2006.01)
  *G08G 1/01*    (2006.01)
  *B60W 50/00*   (2006.01)
  *H04W 4/90*    (2018.01)
  *H04W 4/44*    (2018.01)

(52) U.S. Cl.
  CPC ......... *G08G 1/0116* (2013.01); *G08G 1/0141* (2013.01); *G08G 1/0965* (2013.01); *G08G 1/166* (2013.01); *H04L 47/6275* (2013.01); *H04W 4/46* (2018.02); *H04W 4/90* (2018.02); *B60W 2550/408* (2013.01); *B60W 2710/18* (2013.01); *B60W 2710/20* (2013.01); *B60W 2710/30* (2013.01); *B60W 2720/00* (2013.01); *H04W 4/44* (2018.02)

(58) Field of Classification Search
  CPC ............... H04W 4/46; B60W 50/0098; B60W 2550/408; B60W 2710/18; B60W 2710/20; B60W 2710/30; B60W 2720/00; H04L 47/6275
  See application file for complete search history.

(56)            References Cited

U.S. PATENT DOCUMENTS

2012/0106565 A1*  5/2012  Yousefi .................. H04N 7/183
                                                          370/402
2013/0083679 A1*  4/2013  Krishnaswamy ...... G08G 1/093
                                                          370/252

* cited by examiner

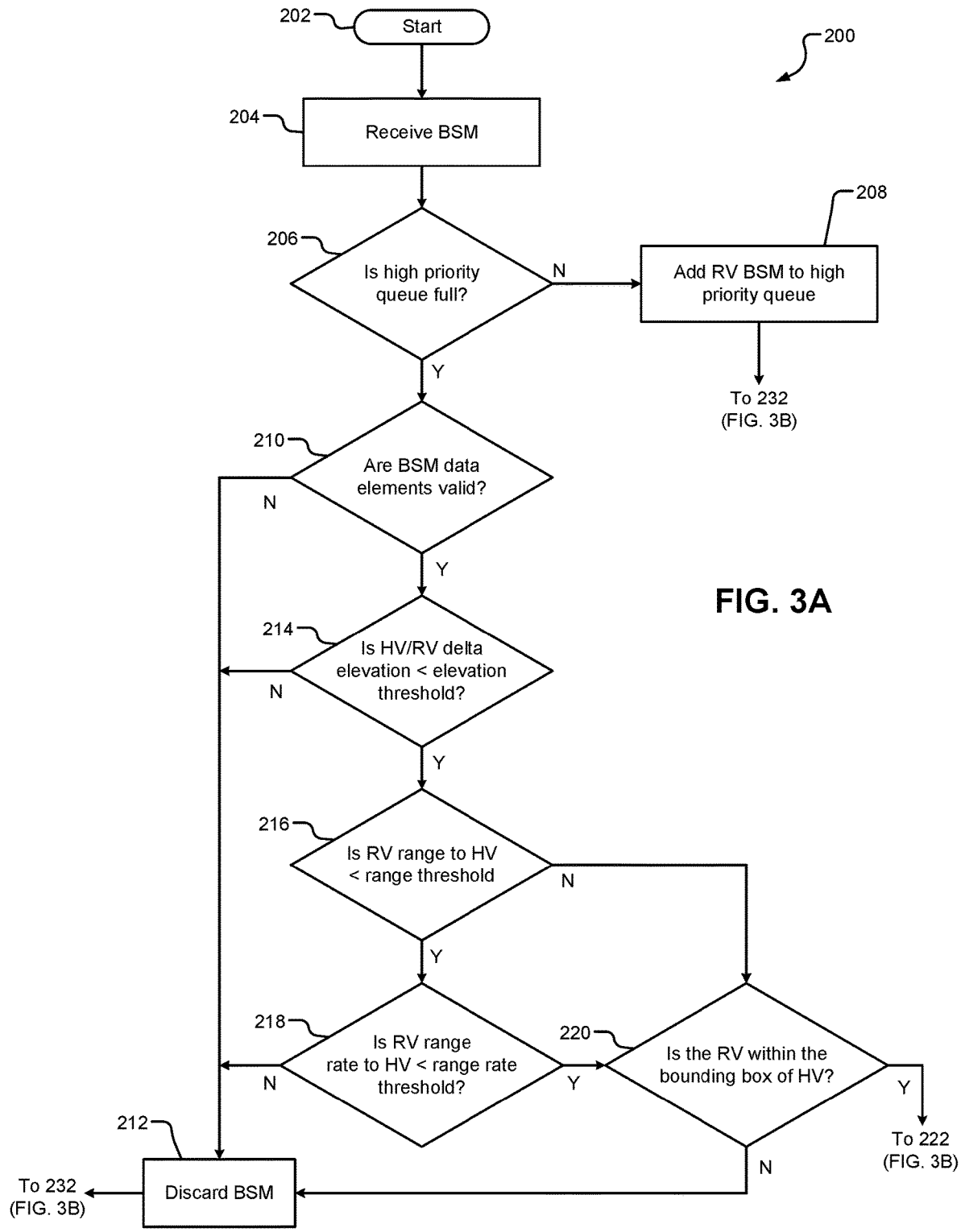

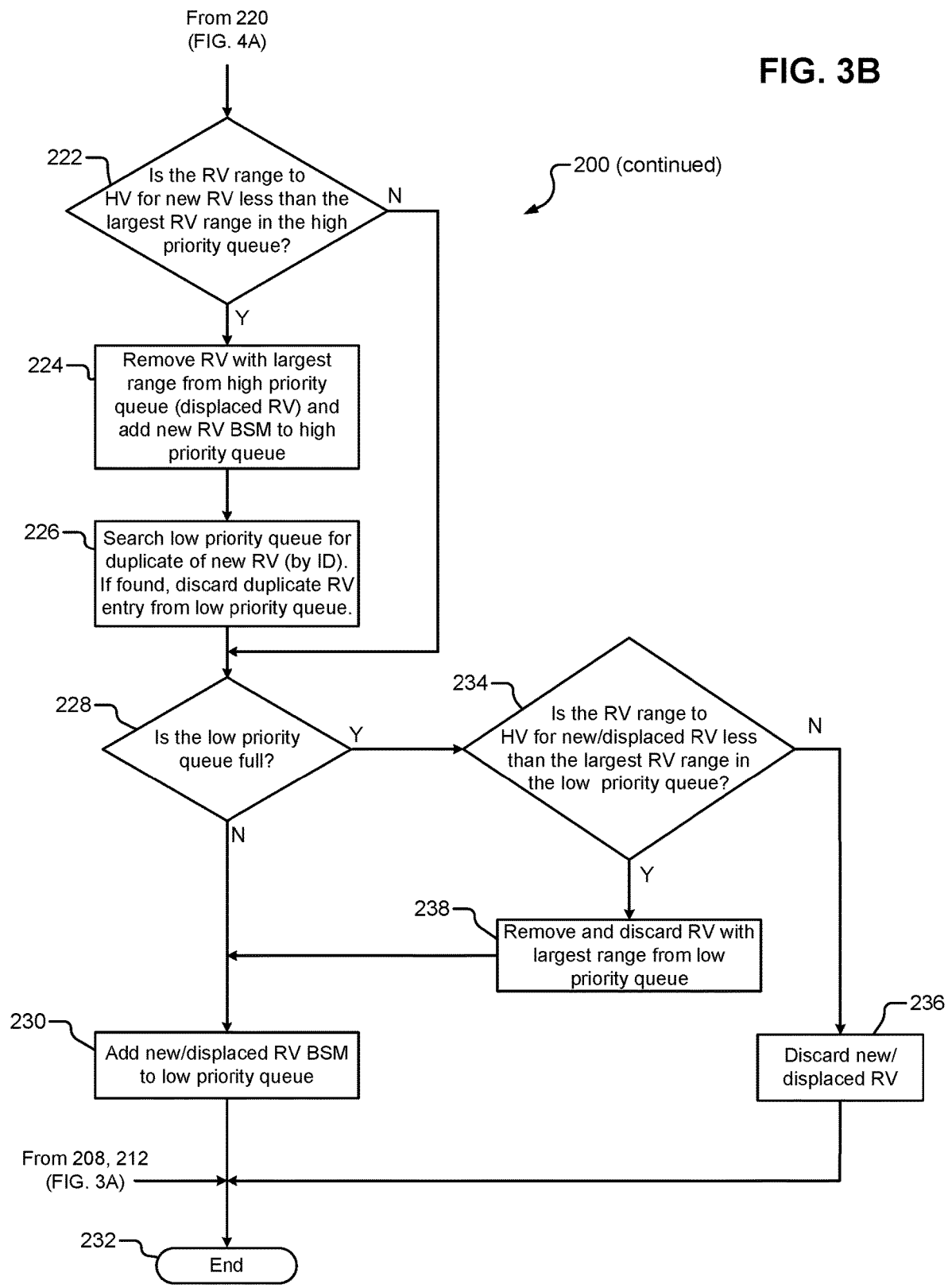

SYSTEMS AND METHODS FOR ADAPTIVE FILTERING OF VEHICLE-TO-VEHICLE MESSAGES FROM REMOTE VEHICLES

CROSS-REFERENCE TO RELATED APPLICATIONS

This application claims the benefit of U.S. Provisional Application No. 62/539,605, filed on Aug. 1, 2017. The entire disclosure of the above application is incorporated herein by reference.

FIELD

The present disclosure relates to vehicle communication systems and, more specifically, to a system and method for adaptively filtering vehicle-to-vehicle messages from remote vehicles.

BACKGROUND

This section provides background information related to the present disclosure which is not necessarily prior art.

Vehicle to vehicle (V2V), vehicle to infrastructure (V2I), vehicle-to-pedestrian (V2P), and vehicle-to-network (V2N) communication systems, collectively referred to as vehicle-to-everything (V2X) systems, allow vehicles to transmit Basic Safety Messages (BSMs) through communication over a vehicle communication radio system to surrounding vehicles in the vicinity. The vehicle communication radio system, for example, can include a dedicated short range communications (DSRC) radio, a cellular-V2X (C-V2X) radio, or any other suitable communication system that allows for a vehicle to transmit and receive BSMs. For example, in vehicle communication radio systems that use DSRC systems, messages are sent and received using 5.9 GHz DSRC communications, which are sent through a 5.9 GHz DSRC antenna. For further example, in vehicle communication radio systems that use C-V2X systems, messages are sent and received using 5G C-V2X communications sent through a cellular antenna. The SAE document titled "On-Board System Requirements for V2V Safety Communications," (J2945/1) provides a standard with rules used to transmit and receive BSMs to and from vehicle communication radio systems.

In certain situations, such as a congested freeway in a major urban area, the V2X system of a particular host vehicle (HV) may receive a large number of BSMs from a large number of remote vehicles (RVs) in the vicinity of the HV. For example, the HV may receive BSMs from 200 or more RVs within a 300 meter range. While it may be possible for the V2X system of the HV to briefly inspect each RV message, the V2X system of the HV may not have the computational resources to fully process all BSMs received from all RVs within the vicinity of the HV. For example, the processing resources required to quickly process and perform full Abstract Syntax Notation One (ASN.1) decoding and detailed classification for all BSMs received from 200 or more RVs within a 300 meter range is not commonly found on traditional low-cost V2X systems. Additionally, some of the BSMs, and in some cases a majority of the BSMs, from the RVs may be disregarded as benign by the safety of life applications of the host vehicle as only a small fraction of the BSMs received by the HV may indicate a threat or situation requiring some action by the HV.

SUMMARY

This section provides a general summary of the disclosure, and is not a comprehensive disclosure of its full scope or all of its features.

A communication system for a vehicle is provided and includes a memory storing a high priority queue and a low priority queue, the high priority queue storing a plurality of first communication messages from a plurality of first remote vehicles in communication with the vehicle and the low priority queue storing a plurality of second communication messages from a plurality of second remote vehicles in communication with the vehicle. The communication system also includes a controller configured to: receive a communication message from a remote vehicle; apply a filter criteria to the communication message from the remote vehicle; store the communication message in one of the high priority queue or the low priority queue based on applying the filter criteria; process and decode the plurality of first communication messages in the high priority queue at a first processing rate; and process and decode the plurality of second communication messages in the low priority queue at a second processing rate. The first processing rate is higher than the second processing rate.

A method is also provided and includes receiving, with a controller of a communication system for a vehicle, a communication message from a remote vehicle, the communication system including a memory storing a high priority queue and a low priority queue, the high priority queue storing a plurality of first communication messages from a plurality of first remote vehicles in communication with the vehicle and the low priority queue storing a plurality of second communication messages from a plurality of second remote vehicles in communication with the vehicle. The method also includes applying, with the controller, a filter criteria to the communication message from the remote vehicle. The method also includes storing, with the controller, the communication message in one of the high priority queue or the low priority queue based on applying the filter criteria. The method also includes processing and decoding, with the controller, the plurality of first communication messages in the high priority queue at a first processing rate. The method also includes processing and decoding, with the controller, the plurality of second communication messages in the low priority queue at a second processing rate. The first processing rate is higher than the second processing rate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3A is a flow chart for a method of adaptive filtering of vehicle-to-vehicle messages according to the present teachings.

FIG. 3B is a flow chart for a method of adaptive filtering of vehicle-to-vehicle messages according to the present teachings.

Corresponding reference numerals indicate corresponding parts throughout the several views of the drawings.

DETAILED DESCRIPTION

Figure 1:
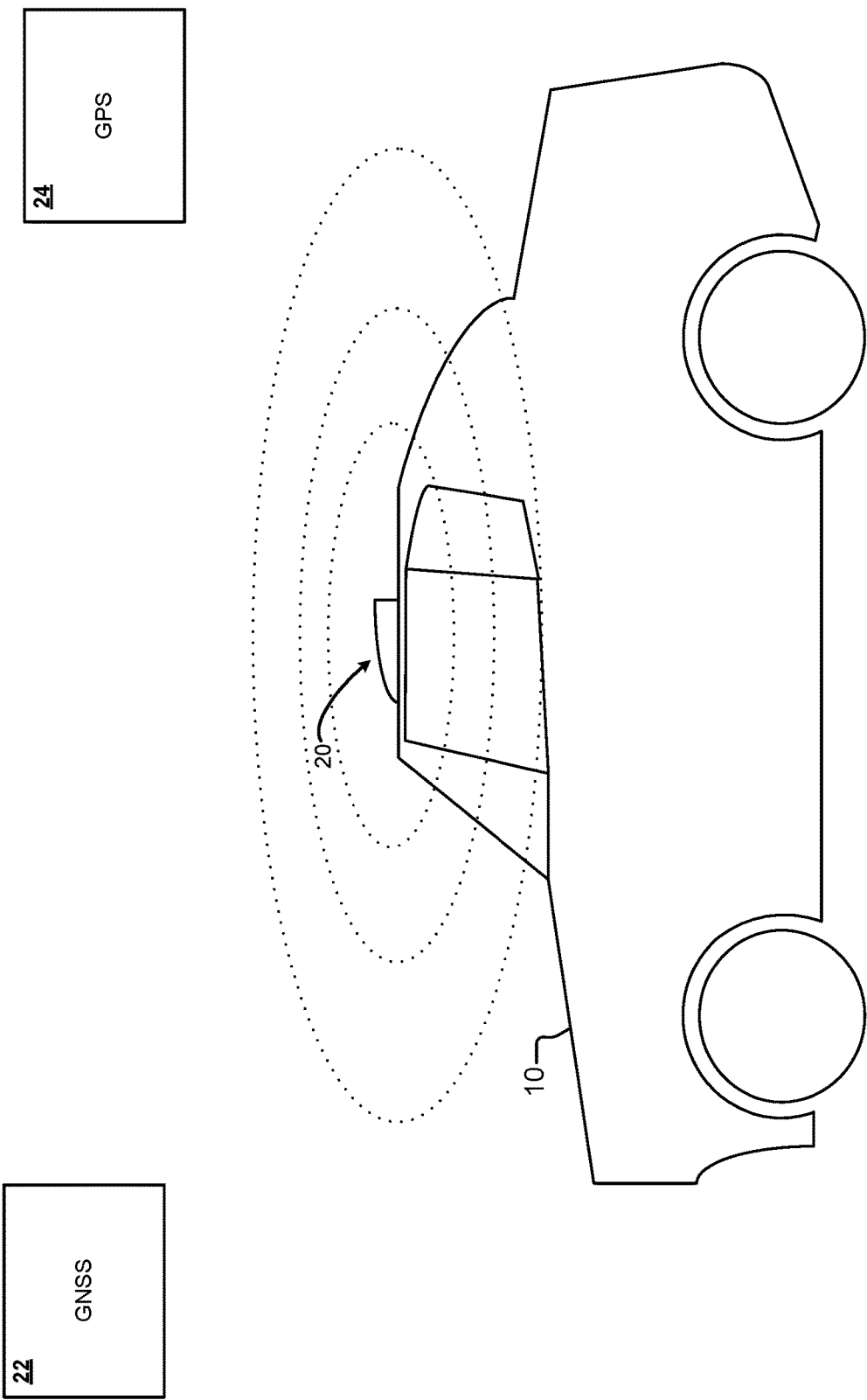
FIG. 1 is an illustration of a vehicle including a vehicle communications system.

Example embodiments will now be described more fully with reference to the accompanying drawings.

As noted above, in certain situations, such as a congested freeway in a major urban area, a V2X system of a host vehicle (HV) may receive a large number of Basic Safety Messages (BSMs) from a large number of remote vehicles (RVs) in the vicinity of the HV. For example, the HV may receive BSMs from 200 or more RVs within a 300 meter range. In these situations, the V2X system of the HV may not have the computational resources to fully process all BSMs received from all RVs within the vicinity of the HV.

Traditionally, when the V2X system determines it is in a congested traffic situation, the V2X system may reduce the frequency with which BSMs are transmitted. For example, the V2X system may include a congestion algorithm that determines the frequency with which BSMs are sent and that reduces the frequency when the V2X system is in a congested traffic situation. For example, in a non-congested traffic situation, the V2X system may transmit 10 BSMs per second, i.e., at a transmit frequency of 10 Hz. As congestion in the vicinity of the V2X communication system increases, the congestion algorithm may decrease the frequency with which BSMs are sent to less than 10 BSMs per second. For example, the congestion algorithm may reduce the frequency to 8, 6, or 4 BSMs per second, i.e., a transmit frequency of 8 Hz, 6 Hz, or 4 Hz, or to as low as 3 BSMs per second, i.e., a transmit frequency 3 Hz. However, in certain congested situations in major urban areas, even with the reduced transmission frequency, the V2X communication system may still receive too many BSMs for the V2X system to process. In other words, even at the reduced transmission frequencies, the V2X system of the HV may still not have the computational resources to fully decode and process all of the incoming BSMs received from all RVs within the vicinity of the HV. This issue will become worse as more and more vehicles on the road use V2X communication systems.

To address these issues, the present disclosure provides systems and methods for adaptively filtering received BSMs through the use of various filter criteria to sort BSMs from RVs into a high priority queue and a low priority queue. The BSMs received from the RVs in the high priority queue are fully decoded and processed as they are received or according to a high priority process time. The high priority process time may be, for example, 100 ms, resulting in a processing rate of ten times per second or 10 Hz in accordance with the maximum BSM transmit rate, as set by the SAE document titled "On-Board System Requirements for V2V Safety Communications," (J2945/1). The high priority process time may be referred to as RV_Filter_HIGH_Process_Time_ms. Other process times or processing rates may be used. The BSMs from RVs in the low priority queue, on the other hand, are sampled and processed at a lower rate to limit the time and computational resources spent on processing BSMs from RVs in the low priority queue. For example, the V2X communication system may impose a limit of processing only, for example, one BSM per second from individual RVs in the low priority queue while discarding any additional BSMs from that individual RV until the next one second cycle. In other words, the BSMs received from the RVs in the low priority queue are fully decoded and processed as according to a low priority process time, which is a longer time period than the high priority process time. For example, the low priority process time may be 1,000 ms, resulting in a processing rate of one time per second or 10 Hz. The low priority process time may be referred to as RV_Filter_LOW_Process_Time_ms. Other process times or processing rates may be used. In this way, the V2X communication system will only fully decode and process a maximum of one BSM per second from an individual RV in the low priority queue. The V2X communication system can then more efficiently and effectively focus and apply its computing resources and time to processing BSMs from the RVs in the high priority queue, as they are received at the rate dictated by the congestion algorithm, i.e., 3-10 BSMs per second (or 3-10 Hz). In this way, the V2X communication system of the HV will fully decode and process BSMs from an RV in the high priority queue in accordance with the high priority process time, which can allow for the BSMs from an RV in the high priority queue to be processed as they are received at the rate dictated by the congestion algorithm, i.e., at a rate of 3-10 BSMs per second (or 3-10 Hz), and will fully decode and process BSMs from an RV in the low priority queue at a rate of 1 BSM per second (or 1 Hz). While specific frequencies and rates are provided here as illustrative examples, other frequencies and rates can alternatively be used based on the hardware resources available for a particular application or operation environment in accordance with the present teachings.

In accordance with the present teachings, BSMs from RVs are placed into the high priority queue until the queue is full. Once a maximum number of BSMs from RVs have been placed in a high priority queue, i.e., once the high priority queue reaches capacity, the systems and methods of the present disclosure engage a filter to selectively categorize BSMs from RVs into either the high priority queue or a low priority queue based on various filter criteria. Each of the filter criteria can be independently enabled, calibrated, and adjusted to suit the particular processing capabilities of the V2X system of the HV and the particular associated application requirements. With the filter engaged, the V2X system of the HV will perform full ASN.1 decoding and processing, in accordance with the high priority process time, for all BSMs received from RVs in the high priority queue that successfully pass the enabled filter criteria and will perform full ASN.1 decoding and processing for only some (e.g., 1 per second) of the BSMs received from RVs in the low priority queue. In this way the filter and the use of the various filter criteria enable the V2X system of the HV to utilize and consume only a minimal amount of processor resources to decide whether a particular BSM should undergo further decoding and threat classification and can dedicate sufficient resources to decode and classify only those BSMs from RVs that successfully pass the enabled filter criteria. This results in more efficient use of the processing resources of the V2X system of the HV and avoids the need for the V2X system of the HV to be provided with more costly processing resources that would otherwise be needed to process, for example, the large number of BSMs that may be received by the V2X system of the HV in certain situations, such as a congested freeway in a major urban area.

Using data elements within the received BSMs from the RVs, the filter of the present disclosure extracts BSM parameters and computes several local measurements by directly indexing to fixed byte offsets in the BSM. This direct indexing to pertinent BSM data elements of interest eliminates the need to perform full ASN.1 decoding of the BSM at the filtering stage, thereby saving valuable processing cycles on each received BSM. Based on the current status of the high and low priority queues and the outcome of the RV filter criteria, the V2X system of the HV can determine whether the BSM from the RV should be placed in the high or low priority queues before performing full ANS.1 decoding of the BSM. If the BSM is not from an RV in the high or low priority queues, the V2X system can determine whether the transmitting RV for the BSM should displace one of the RVs already in one of the queues, based on the filter criteria. If the filter criteria indicates that the new RV should not displace one of the RVs in one of the queues, the V2X system can simply discard the BSM without further processing.

The queues can be implemented with predetermined sizes. For example, the high priority queue can have a predetermined size such that it is limited to a threshold of 20 unique RVs. Any other number of RVs, however, can alternatively be used based on the available system resources of the HV, such as the particular electronic control unit (ECU) hardware, the speed of the processor (CPU), the available memory, etc. The size or limit of the high priority queue may be referred to as RV_Filter_HIGH_Queue_Max. Once the high priority queue has reached its full capacity and BSMs from additional RVs are received, the filter can begin to eliminate BSMs from RVs in the high priority queue based on the distance from the sending RV to the HV. For example, the filter begins by eliminating a BSM from an RV in the high priority queue with a greatest associated distance to the HV. Any RVs that are eliminated from the high priority queue may be transitioned to the low priority queue provided that BSMs from those RVs pass the applicable filter criteria, as described in further detail below. Similar to the high priority queue, the low priority queue can have a predetermined size such that it is limited to a threshold of 20 unique RVs. Any other number of RVs, however, can alternatively be used based on the available system resources of the HV, such as the particular electronic control unit (ECU) hardware, the speed of the processor (CPU), the available memory, etc. The size or limit of the low priority queue may be referred to as RV_Filter_Low_Queue_Max.

As noted above, BSMs from RVs in the low priority queue are processed at a reduced sample rate to limit the processing time and resources dedicated to processing of BSMs from RVs in the low priority queue. For example, the reduced sample time, or low priority process time, may be 1,000 milliseconds, or 1 second. In other words, the V2X system may only process 1 BSM per second from the BSMs in the low priority queue. As noted above, the reduced sample time may be referred to as RV_Filter_LOW_Process_Time_ms. In this way, RVs in the low priority queue that are located at the far end of the filter criteria range are processed with a lower priority and at a lower rate than BSMs from RVs in the high priority queue. As such, the V2X system can more effectively and efficiently utilize its computing resources to process BSMs from the RVs in the high priority queue more likely to be a potential threat to the HV and can limit and/or reduce the amount computing resources used to process BSMs from RVs in the lower priority queue.

With reference to FIG. 1, a vehicle 10 is shown having a vehicle communication radio system 20 for vehicle to vehicle (V2V), vehicle to infrastructure (V2I), vehicle to pedestrian (V2P), and vehicle to network (V2N), collectively referred to as vehicle to everything (V2X), communication. The vehicle communication radio system 20 can be, for example, a dedicated short range communication (DSRC) system or a cellular-V2X (C-V2X) system). While the vehicle 10 is described as being equipped with a DSRC system or a C-V2X system, any other suitable vehicle communication system for V2X communication can be used. Further, while the vehicle communication radio system 20 is illustrated and described as being disposed on a vehicle 10, the present disclosure is applicable to V2X communication systems installed on vehicles, infrastructure, or any other V2X communication location. Additionally, while the present disclosure describes communications between a host vehicle (HV) and a remote vehicle (RV), it is understood that this is for example purposes only and that present teachings are applicable to communication by or between a vehicle communication radio system 20 and any remote message-sending system, including remote infrastructure, a remote pedestrian, etc. Further, while FIG. 1 shows the vehicle communication radio system 20 installed in an automobile, or light vehicle, the present teachings are applicable to communication between any other types of vehicles, such as, for example, heavy equipment, heavy trucks, motorcycles, bicycles, etc., as well as pedestrian systems. For simplicity, communications from any source other than the HV, such as communications from an infrastructure communication system, a pedestrian communication system, another vehicle, etc., will be referred to as communications from an RV.

The vehicle communication radio system 20 may be configured to transmit and receive signals critical to collision avoidance, such as current position and speed, to/from remote vehicles (RVs) that are also equipped with V2X systems and/or to/from an infrastructure communication location equipped with a V2X system. The signals can be used, for example, to provide early warnings or avoidance of accidents and driving hazards. Additionally, the vehicle communication radio system 20 may be configured to predict future accidents and driving hazards based on communication with remote vehicles and/or infrastructure communication locations that are also equipped with V2X systems by calculating the current and future positions of the vehicle 10.

The vehicle communication radio system 20 may include an antenna, such as, for example, a 5.9 GHz DSRC antenna, a 5G cellular antenna, or any other suitable communications antenna, and can receive information from Global Network Satellite Systems (GNSS) 22 and/or Global Positioning Systems (GPS) 24, which communicate with the vehicle communication radio system 20. The vehicle communication radio system 20 can also receive Basic Safety Messages (BSMs) periodically transmitted by other vehicles, infrastructure, pedestrians, networks, etc., The BSMs can contain information about the RV sending the BSM, such as the current position, position accuracy, speed, heading, brake status, and other vehicle, infrastructure, pedestrian, network, etc., related information. The SAE document titled "On-Board System Requirements for V2V Safety Communications," (J2945/1) provides a standard with rules used to transmit and receive BSMs to and from vehicle communication radio systems and defines the frequency, power, etc., for transmitting BSMs. Through the use of V2X technology and communication systems, vehicle safety is improved through the use of vehicle systems operating with a higher level of information about the vehicle's surroundings, including information about surrounding vehicles, infrastructure, pedestrians, the locations of hazards, developing situations ahead, etc.

All of the components of the vehicle communication radio system 20 may be located at one or multiple locations on the roof of the vehicle 10. Alternatively, some of the components may be located in the interior of the vehicle 10. While the vehicle communication radio system 20 of FIG. 1 is illustrated as being located on the roof of the vehicle 10, in other embodiments, the vehicle communication radio system 20, and any or all of its components, may be disposed at any location on the vehicle 10, including include the front, rear, sides, and/or inside the vehicle 10.

The vehicle communication radio system 20 may operate in both line-of-sight (LOS) and non-line-of-sight (NLOS) conditions, thereby allowing the vehicle communication radio system 20 of the vehicle 10 to communicate BSMs, including warnings and driving hazards, even with blockage from intervening vehicles, blind corners, or roadside infrastructure. Signals from the vehicle communication radio system 20 are illustrated radiating outward in a circular pattern, as indicated by dotted circles.

Figure 2:
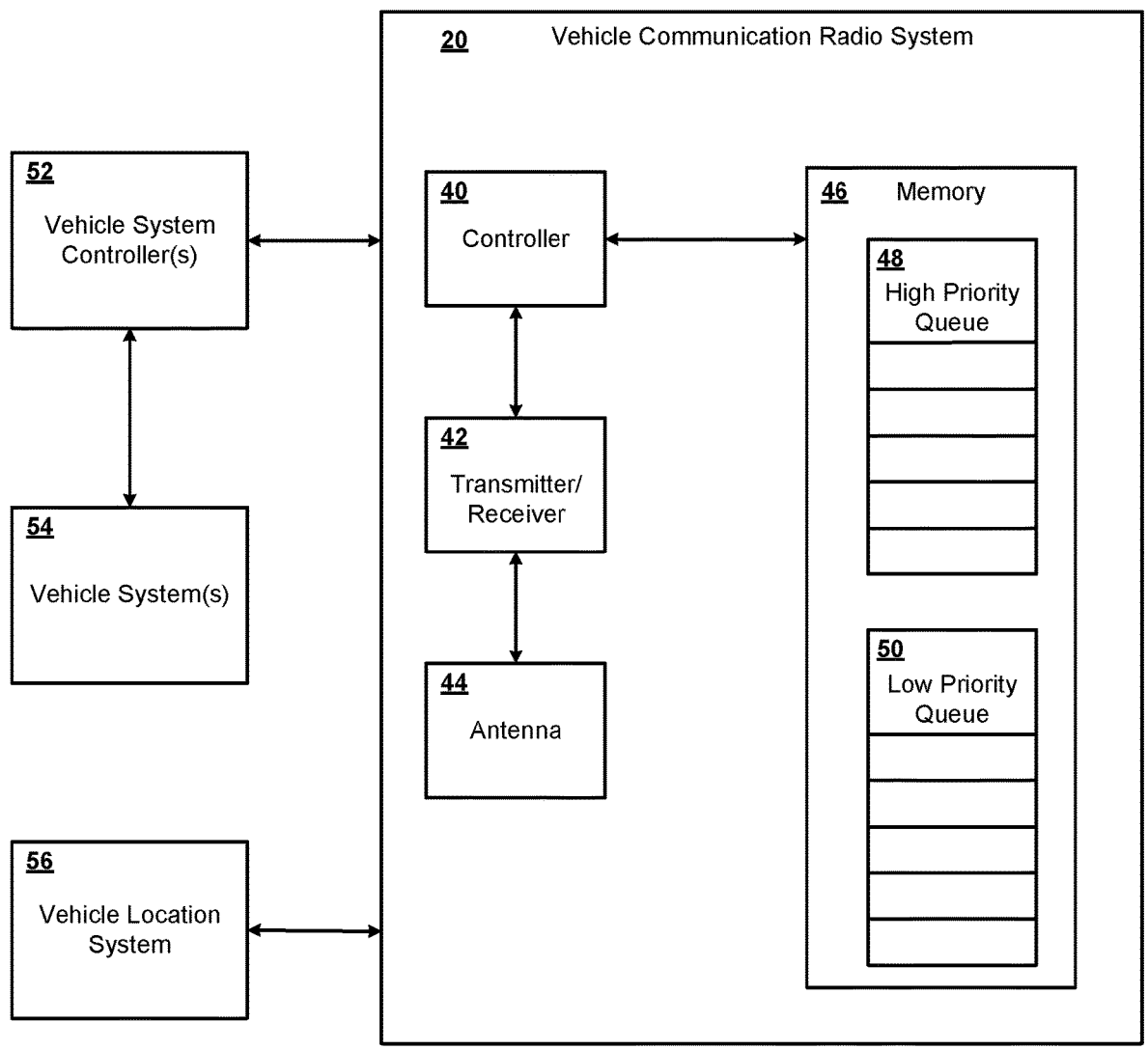
FIG. 2 is a block diagram of vehicle communication system according to the present teachings.

With reference to FIG. 2, a block diagram showing components of the vehicle 10, including the vehicle communication radio system 20, is illustrated. As shown in FIG. 2, the vehicle communication radio system 20 includes a controller 40. The controller 40 may include a processor, such as a central processing unit (CPU), and memory, such as random access memory (RAM) and/or read only memory (ROM), that stores programs/code sufficient to implement the functionality described herein. As an example, the controller 40 may be a microcomputer or other processing device programmed to carry out the functionality described here. As noted below, the term "controller" may be replaced with the term "module" and may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip. Additionally, while FIG. 2 shows a single controller 40, the vehicle communication radio system 20 can include multiple controllers operating in parallel to perform the functionality described herein. In such case, the processing described as being performed by controller 40 could be split amongst the multiple controllers.

As shown in FIG. 2, the vehicle communication radio system 20 also includes a transmitter/receiver 42 and an antenna 44 that are used to transmit and receive signals to and from other communication devices, such as vehicle communication radio systems 20 of RVs. While FIG. 2 shows transmitter/receiver 42, a transceiver can be used, a separate transmitter and a separate receiver can be used, and/or any other communication devices for transmitting and receiving radio frequency (RF) signals can be used. In the example of FIG. 2, the controller 40 controls the transmitter/receiver 42 to transmit and receive RF signals using the antenna 44. For example, the controller 40 can control the transmitter/receiver 42 to transmit and receive BSMs to and from RVs using the antenna 44. Additionally, the controller 40 can control the transmitter/receiver 42 to use the antenna 44 to receive GPS signals from GPS 24 and/or GNSS signals from GNSS 22 (shown in FIG. 1). The GPS signals and/or the GNSS signals can be used by a vehicle location system 56, such as a vehicle GPS, to determine a location of the vehicle 10. While the vehicle location system 56 is described as using GPS or GNSS signals, other vehicle location systems could be used, such as vehicle location systems that determine the location of the vehicle 10 based on image data collected by image sensors of the vehicle 10 and/or vehicle location systems that determine the location of the vehicle 10 based on communication with other vehicles or infrastructure surrounding the vehicle.

As further shown in FIG. 2, the vehicle communication radio system 20 includes a memory 46 accessible to the controller 40. The memory 46 is a computer-readable medium and stores a high priority queue 48 and a low priority queue 50. As discussed in further detail below, the controller 40 can receive BSMs from RVs and classify the BSMs from the RVs in either the high priority queue 48 or the low priority queue 50. In addition, the controller 40 can also move BSMs from RVs in the high priority queue 48 to the low priority queue 50 and/or from the low priority queue 50 to the high priority queue 48. The high priority queue 48 and the low priority queue 50 store temporary identifiers associated with the RV that sent the particular BSM for each BSM classified and stored in each of the queues. The temporary identifier provides temporary identification of RVs located in the communication range of the HV. The temporary identifiers are randomized periodically to prevent long term trackability of V2X equipped vehicles.

As further shown in FIG. 2, the vehicle communication radio system 20 is in communication with one or more vehicle system controller(s) 52 that control one or more vehicle system(s) 54. For example, the vehicle system(s) 54 could include a braking system that provides braking for the vehicle 10, a steering system that provides steering of the vehicle 10, a throttle system that controls a throttle of the vehicle 10, a transmission system that controls a transmission of the vehicle 10, a lighting system that controls lights of the vehicle 10, and/or a warning system that controls and outputs visual, audio, or haptic warnings to a driver or occupant of the vehicle 10. Each of the vehicle system(s) 54 can be controlled by one of the vehicle system controller(s) 52. Additionally or alternatively, one of the vehicle system controller(s) 52 can control one or more of the vehicle system(s) 54. The vehicle system controller(s) 52 are in communication with the vehicle communication radio system 20 and may receive information regarding the surroundings of the vehicle 10 based on BSMs processed by the vehicle communication radio system 20, as described in further detail below, and may control the applicable vehicle system(s) 54 based on the received information about the surroundings of the vehicle 10. For example, the vehicle system controller(s) 52 may receive information that there is a potential threat or other obstacle in the roadway ahead based on one or more BSMs received by the vehicle communication radio system 20 from RVs. Based on the received information, the vehicle system controller(s) 52 can control the warning system of the vehicle 10 to output a visual, audio, or haptic warning to a driver or occupant of the vehicle 10. Additionally or alternatively, the vehicle system controller(s) 52 can control the braking system to slow down the vehicle 10. Additionally or alternatively, the vehicle system controller(s) 52 can control the steering system to steer the vehicle 10 into a different lane or appropriately control other vehicle systems 54 to avoid or minimize the particular threat or obstacle.

The vehicle system controller(s) 52 may also implement a number of driver assistance applications, including safety of life applications. For example, the vehicle system controller(s) 52 may implement an adaptive cruise control application, a forward collision warning application, a blind spot monitoring and warning application, an intersection crash warning application, an autonomous driving application, etc.

With reference to FIG. 3A, a flow chart for a method 200 of adaptive filtering BSMs and, more specifically, of classifying BSMs from RVs into the high priority queue 48 and the low priority queue 50, according to the present teachings is shown. The method 200 can be performed, for example, by the controller 40 of the vehicle communication radio system 20. As noted above, the vehicle communication radio system 20 can include multiple controllers. In such case, the method 200 could be performed by the multiple controllers and different steps or portions of the method 200 could be performed by different controllers of the vehicle communication radio system 20 working together. The method 200 starts at 202.

At 204, the controller 40 receives a BSM from an RV. At 206, the controller 40 determines whether the high priority queue 48 is full. For example, the controller 40 may compare the number of BSMs from RVs already in the high priority queue 48 to the size or limit of the high priority queue 48, referred to as RV_Filter_HIGH_Queue_Max. If the high priority queue 48 is not full, the controller proceeds to 208 and adds the BSM from the RV to the high priority queue 48. The controller then proceeds to 232 (shown in FIG. 3B) and ends.

At 206, when the high priority queue 48 is full, the controller 40 proceeds to 210. At 210, the controller 40 checks to see if the relevant BSM data elements required to complete the filter checks are valid. For example, the controller 40 can use direct indexing, as discussed above, to examine whether the BSM contains valid input data at predetermined indexed data fields within the BSM packet without fully decoding the BSM packet using ASN.1 decoding. For example, the controller 40 can check to see if the BSM includes valid data elements for the latitude, longitude, and elevation data associated with the RV that sent the BSM. When an RV sends a BSM, the BSM should include latitude, longitude, and elevation data for the RV that is sending the BSM. The latitude, longitude, and elevation data is retrievable from the BSM at predetermined indexable locations within the BSM packet without having to fully decode the BSM using ASN.1 decoding. The controller 40 can directly index into the BSM to check the predetermined locations and determine whether valid data is contained in the BSM for latitude, longitude, and elevation. At 210, when the BSM includes data elements that are not valid, the controller proceeds to 212 and discards the BSM without adding the BSM from the RV to either the high or the low priority queue. The controller 40 then proceeds to 232 (shown in FIG. 4B) and ends.

At 210, when all BSM data elements are valid, the controller 40 proceeds to 214. At 214, the controller 40 checks the absolute delta elevation between the RV and the HV. For example, the controller 40 can access data about the elevation of the HV based on data received from the vehicle location system 56. In addition, the BSM from the RV includes elevation data indicating the elevation of the RV. At 210, the controller 40 compares the absolute difference (i.e., the absolute value of the difference) in elevation, or delta elevation, between the HV and the RV with an elevation threshold. The elevation threshold, for example, may be referred to as RV_Filter_Delta_Elev_Thres_m. The elevation threshold may be, for example, set at 10 meters. Alternatively, the elevation threshold may be a function of the range or distance between the RV and the HV. For example, the elevation threshold may be increased as the distance between the RV and the HV increases to compensate or account for the road grade as the range or distance between the RV and the HV increases. If the difference in elevation is less than the elevation threshold, the controller 40 proceeds to 216. If the difference in elevation is not less than the elevation threshold, then the RV and the HV are considered to be at different road heights. In other words, the RV and HV are considered to be on different roads, such as different sections of a multiple section overpass with the multiple different sections of the overpass being at different elevations. In such case, if the difference in elevation is not less than the elevation threshold, the controller 40 proceeds to 212 and discards the BSM without adding the BSM from the RV to either the high or the low priority queue. The controller 40 then proceeds to 232 (shown in FIG. 3B) and ends. The elevation filter criteria can be selectively enabled. In some implementations or embodiments, the elevation filter criteria can be disabled and, in such case, the controller 40 would skip 214 and proceed from 210 directly to 216 when the BSM data elements are valid at 210.

At 214, when the difference in elevation between the HV and the RV is less than the elevation threshold, the controller 40 proceeds to 216 to initiate ranging criteria. At 216, the controller 40 determines the range or distance between the HV and RV. The controller 40, for example, can access information indicating the location of the HV and can retrieve information indicating the location of the RV from the BSM. The controller 40 can then determine the distance between the HV and RV and can compare the distance with a range threshold. The range threshold, for example, may be referred to as RV_Filter_Range_Thresh_m. The range threshold may be, for example, 300 meters. At 216, when the distance between the HV and the RV is less than the range threshold, the controller 40 proceeds to 218. At 216, when the distance between the HV and the RV is not less than the range threshold, the controller 40 proceeds to 220.

At 218, the controller 40 determines a rate of change of the distance between the HV and the RV. For example, the controller 40 can access information regarding the current location, speed, and direction of the HV based on information from the vehicle location system 56. The controller 40 can also access information regarding the current location, speed, and direction of the RV based on information from the BSM. Based on the current location, speed, and direction of the HV and the RV, the controller 40 can determine a rate of change of the distance between the HV and the RV. The controller 40 can then compare the rate of change of the distance between the HV and the RV with a range rate threshold. The range rate threshold is referred to as RV_Filter_Range_Rate_Thresh_mps. The range rate threshold, for example, can be 20 meters per second, or 20 m/s. A negative range rate would correspond to the RV moving towards the HV. As such, setting the range rate threshold to a positive value would correspond to the RV moving away from the HV, but not as quickly. Alternatively, the range rate threshold could be set to zero or to a negative value to only capture BSMs from an RV that is moving towards, or closing in on, the HV.

At 218, when the controller 40 determines that the range rate is not greater than the range rate threshold, the RV is in close proximity to the HV and is not moving away quickly from the HV. In this case, the RV is most likely in a lane of traffic moving in an opposite direction from the HV. In this case, the controller 40 proceeds to 212 and discards the BSM without adding the BSM from the RV to either the high or the low priority queues. The controller 40 then proceeds to 232 (shown in FIG. 3B) and ends. The ranging filter criteria can be selectively enabled. In some implementations or embodiments, the ranging filter criteria can be disabled and, in such case, the controller 40 would skip steps 216 and 218 and proceed from either 210 or 214 directly to 220, depending on whether the elevation filter criteria is enabled.

Figure 6:
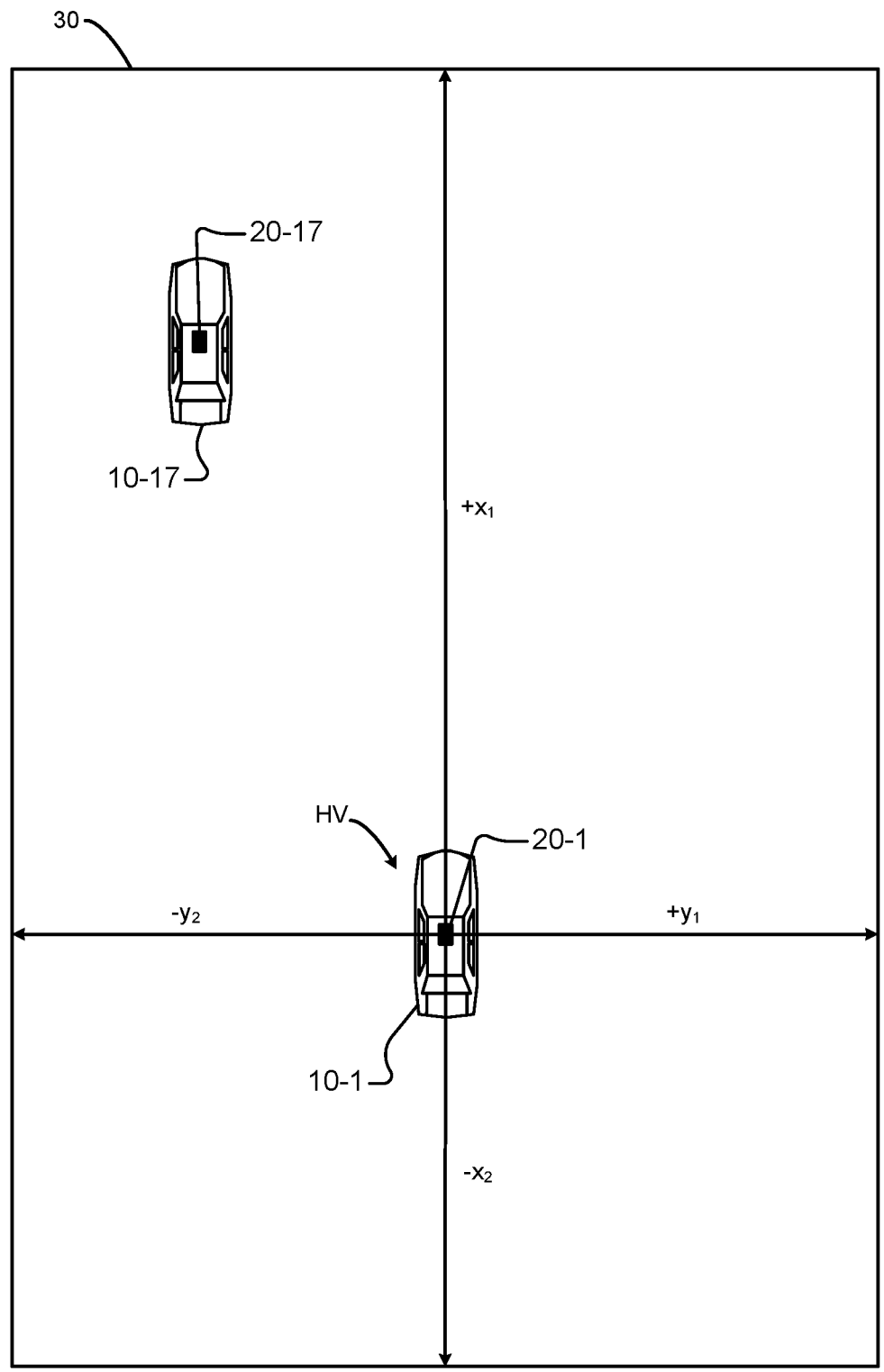
FIG. 6 is an illustration of a bounding box of host vehicle.

At 218, when the range rate is greater than the range rate threshold, the controller 40 proceeds to 220 and determines whether the RV is within a bounding box of the RV. With reference to FIG. 6, a bounding box 30 is shown for HV 10-1. The bounding box is centered on the HV 10-1 and is defined by a forward distance of $+x_1$, a rearward distance of $-x_2$, a first lateral distance of $+y_1$, and a second lateral distance of $-y_2$, as discussed in further detail below. Based on the distance information included in the BSM and based on information about the HV's own location from the vehicle location system 56, the controller 40 can determine whether the RV that sent the BSM is located within the bounding box 30 centered on the HV. In an example embodiment, the forward distance $+x_1$ may be 300 meters, the rearward distance $-x_2$ may be 150 meters, and the first and second lateral distances $+y_1$, $-y_2$ may be 200 meters. Although particular example distances are provided, any suitable distances for the forward distance, the rearward distance, and the first and second lateral distances can be used. As shown in the example of FIG. 6, the RV 10-17 is located within the bounding box of the HV 10-1.

With reference again to FIG. 3A, at 220, when the controller 40 determines that the RV is not within the bounding box 30, the controller 40 proceeds to 212 and discards the BSM without adding the BSM from the RV to either the high or the low priority queues. The controller 40 then proceeds to 232 (shown in FIG. 3B) and ends. The bounding box filter criteria can be selectively enabled. In some implementations or embodiments, the bounding box filter criteria can be disabled and, in such case, the controller 40 would skip step 220 and proceed from either 210, 214, or 218 directly to 222, depending on whether the applicable filter criteria are enabled.

At 220, when the RV is within the bounding box of the HV, the controller 40 proceeds to 222 of FIG. 3B. At 222, the controller 40 determines whether the RV range, or distance from the RV that sent the BSM to the HV, is less than the largest RV range in the high priority queue. In other words, the controller 40 determines whether the BSM is from an RV that is closer to the HV than the RV in the high priority queue with the largest range to the HV. At 222, when the RV range is not less than the largest RV range in the high priority queue, the controller proceeds to 228 and initiates determining whether the BSM from the RV should be placed in the low priority queue, as discussed in further detail below.

At 222, when the RV range, or distance from the RV that sent the BSM to the HV, is less than the largest RV range in the high priority queue, the controller proceeds to 224. At 224, the controller 40 removes the RV with the largest range from the high priority queue and adds the new BSM from the RV to the high priority queue. The removed RV is referred to as the displaced RV since it was displaced from the high priority queue. The controller 40 then proceeds to 226.

At 226, the controller 40 searches the low priority queue to see if the RV that was just added to the high priority queue 48 is also present in the low priority queue 50. For example, the controller 40 searches the low priority queue for a temporary identifier that matches the temporary identifier of the RV BSM that was just added to the high priority queue 48. If a duplicate is found, such that the RV that was just added to the high priority queue 48 is also present in the low priority queue 50, the controller 40 discards or deletes the duplicate entry from the low priority queue 50. The controller then proceeds to 228.

At 228, the controller 40 initiates determining whether the new RV BSM (if the controller 40 is coming from step 222) or the displaced RV BSM (if the controller 40 is coming from step 226) should be added to the low priority queue 50. At 228, the controller 40 determines if the low priority queue 50 is full.

At 228, if the controller 40 determines that the low priority queue 50 is not full, the controller 40 proceeds to 230 adds the new/displaced RV BSM to the low priority queue 50. The controller 40 then proceeds to 232 and ends.

At 228, if the controller 40 determines that the low priority queue 50 is full, the controller 40 proceeds to 234 and determines whether the RV range to the HV for the new/displaced RV is less than the largest RV range in the low priority queue 48 (similar to step 222 discussed above for the high priority queue 50). At 234, if the RV range to the HV for the new/displaced RV is not less than the largest RV range in the low priority queue 50, the controller 40 proceeds to 236 and discards the BSM from the new/displaced RV. The controller 40 then proceeds to 232 and ends.

At 234, if the RV range to the HV for the new/displaced RV is less than the largest RV range in the low priority queue 50, the controller 40 proceeds to 238 and removes and discards the RV with the largest range from the low priority queue 50. The controller 40 then proceeds to 230 and adds the new/displaced RV BSM to the low priority queue. The controller 40 then proceeds to 232 and ends.

In this way, the controller 40 uses the above described filter criteria to efficiently categorize BSMs from RVs communicating with the HV into the high priority queue 48 or the low priority queue 50. BSMs from RVs in the high priority queue 48 will be processed according to the higher processing rate, determined by the high process time, e.g., 100 ms or 10 Hz, while BSMs from RVs in the low priority queue 50 will be processed according to the lower processing rate, determined by the low process time, e.g., 1,000 ms or 1 Hz. In this way, the controller 40 can efficiently and effectively conserve and utilize its processing resources to process BSMs from the most relevant RVs.

Figure 4A:
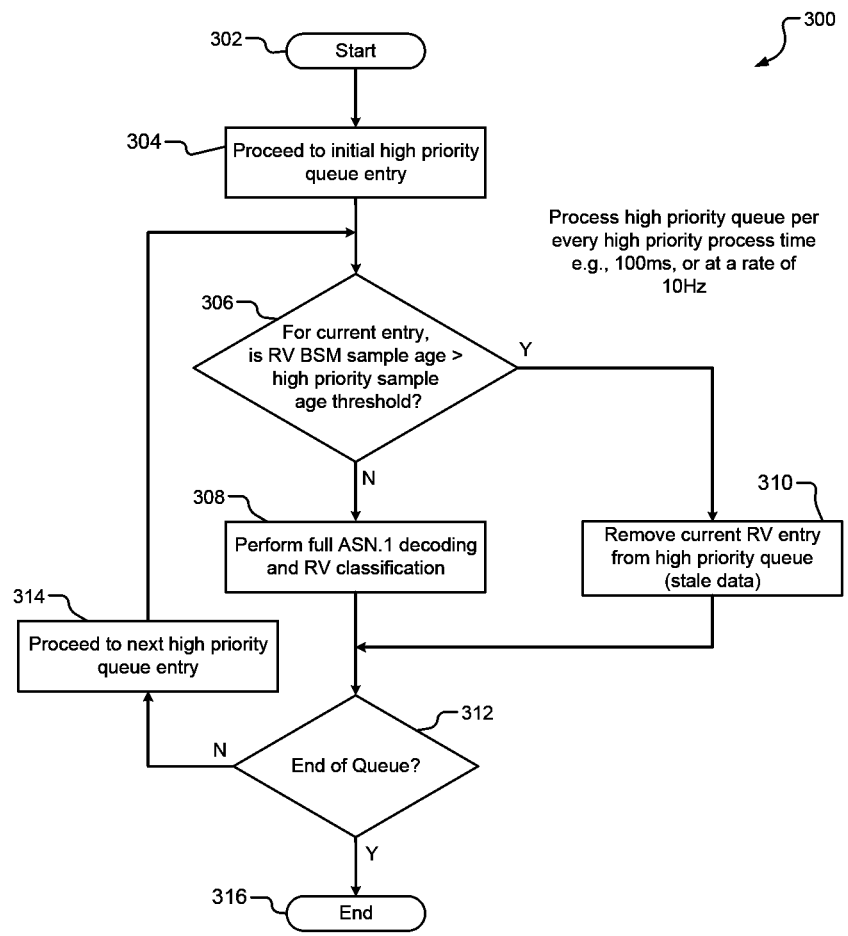
FIG. 4A is a flow chart for a method of adaptive filtering of vehicle-to-vehicle messages according to the present teachings.

With reference to FIG. 4A, a method 300 for processing BSMs from the high priority queue 48 is shown. The method 300 can be performed, for example, by the controller 40 of the vehicle communication radio system 20. As noted above, the vehicle communication radio system 20 can include multiple controllers. In such case, the method 300 could be performed by the multiple controllers and different steps or portions of the method 300 could be performed by different controllers of the vehicle communication radio system 20 working together. The method 300 starts at 302.

At 304, the controller 40 proceeds to the initial entry in the high priority queue 48. For example, the high priority queue 48 may be a first-in-first-out (FIFO) queue such that the earliest received BSM from an RV is the first-out or initial entry in the high priority queue 48. The controller 40 then proceeds to 306.

At 306, for the current entry, the controller 40 determines whether the age of the current RV BSM, referred to as RV BSM sample age, is greater than a high priority sample age threshold. The high priority sample age threshold, for example, may be 650 ms, and is referred to as RV_Filter_ HIGH_Max_Sample_Age_ms. While the current example is provided using a high priority sample age threshold of 650 ms, other time periods can be used. The controller 40 determines the RV BSM sample age based on the length of time between the time stamp indicating when the RV BSM was received by the controller 40 and the current time. BSM samples may be processed multiple times by "coasting" or extrapolating the RV data forward to the present time during each queue process cycle. Due to degradation in accuracy as samples are coasted for increasing time, a maximum time limit is established where samples are deemed to old/stale to coast and must be discarded. When the RV BSM sample age is not greater than the high priority sample age threshold, the controller 40 proceeds to 308 and performs full ASN.1 decoding and RV classification of the RV BSM at that entry in the high priority queue. The controller 40 then proceeds to 312, as discussed in further detail below.

At 306, when the controller 40 determines that the RV BSM sample age is greater than the high priority sample age threshold, the controller 40 proceeds to 310 and removes the current RV entry from the high priority queue 58. In this case, the high RV BSM sample age is deemed to indicate that the BSM is stale or too old and, as such, is discarded without being decoded or fully processed. The controller then proceeds to 312.

At 312, the controller 40 determines whether it has reached the end of the high priority queue 48. At 312, if the controller 40 has not reached the end of the high priority queue 48, the controller proceeds to 314 and goes to the next entry in the high priority queue 48. The controller 40 then loops back to 306 and again compares the RV BSM sample age of the current entry to the high priority sample age threshold.

At 312, if the controller 40 has reached the end of the high priority queue 48, the controller proceeds to 316 and ends the method 300.

The method 300 for processing the high priority queue 48 is performed periodically in accordance with the high priority process time, such as 100 ms. The high priority process time may be referred to as RV_Filter_HIGH_Process_ Time_ms. In other words, the controller 40 can execute the method 300 for processing the high priority queue 48 once every 100 ms or at a cycle rate of 10 Hz. In addition, method 300 can be performed asynchronously, and in parallel with, method 200 related to placing the RV BSMs in the high and low priority queues. Put another way, the controller 40 can place the RV BSMs it the high and low priority queues, according to method 200, asynchronously with the processing of the RV BSMs from the high priority queues, according to method 300 and method 320, discussed below.

Figure 4B:
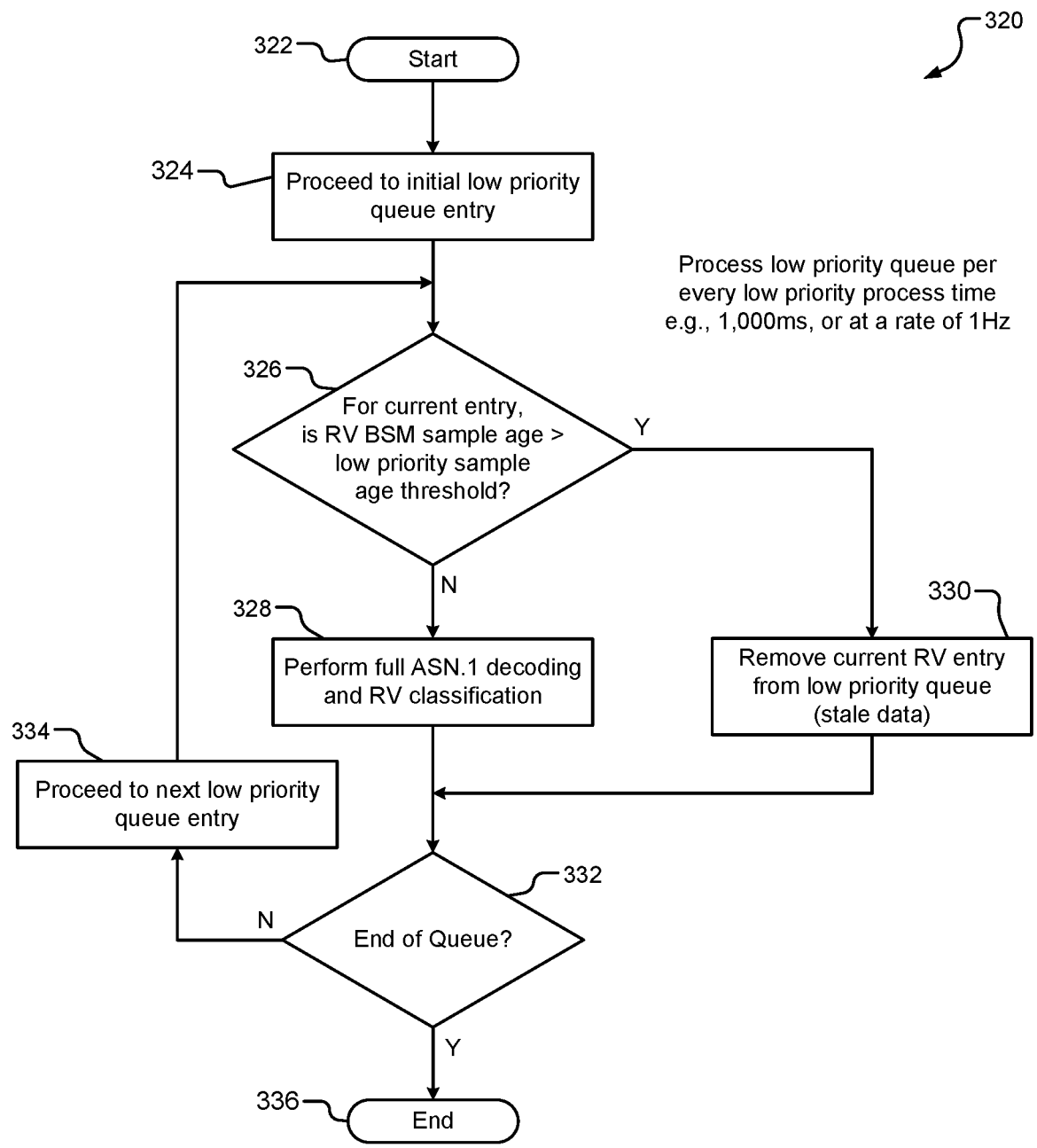
FIG. 4B is a continuation of the flow chart of FIG. 4A for a method of adaptive filtering of vehicle-to-vehicle messages according to the present teachings.

With reference to FIG. 4B, a method 320 for processing BSMs from the low priority queue 50 is shown. The method 320 can be performed, for example, by the controller 40 of the vehicle communication radio system 20. As noted above, the vehicle communication radio system 20 can include multiple controllers. In such case, the method 320 could be performed by the multiple controllers and different steps or portions of the method 320 could be performed by different controllers of the vehicle communication radio system 20 working together. The method 320 starts at 322.

At 324, the controller 40 proceeds to the initial entry in the low priority queue 50. For example, the low priority queue 50 may be a first-in-first-out (FIFO) queue such that the earliest received BSM from an RV is the first-out or initial entry in the low priority queue 50. The controller 40 then proceeds to 326.

At 326, for the current entry, the controller 40 determines whether the age of the current RV BSM, referred to as RV BSM sample age, is greater than a low priority sample age threshold. The low priority sample age threshold may be larger than the high priority sample age threshold. For example, the high priority sample age threshold may be 650 ms, as discussed above, while the low priority sample age threshold may be 2,000 ms. The low priority sample age threshold may be referred to as RV_Filter_LOW Max_ Sample_Age_ms. While the current example is provided using a low priority sample age threshold of 2,000 ms, other time periods can be used. As discussed above, the controller 40 determines the RV BSM sample age based on the length of time between the time stamp indicating when the RV BSM was received by the controller 40 and the current time. When the RV BSM sample age is not greater than the low priority sample age threshold, the controller 40 proceeds to 328 and performs full ASN.1 decoding and RV classification of the RV BSM at that entry in the low priority queue. The controller 40 then proceeds to 332, as discussed in further detail below.

At 326, when the controller 40 determines that the RV BSM sample age is greater than the low priority sample age threshold, the controller 40 proceeds to 320 and removes the current RV entry from the low priority queue 50. In this case, the high RV BSM sample age is deemed to indicate that the BSM is stale or too old and, as such, is discarded without being decoded or fully processed. The controller then proceeds to 332.

At 332, the controller 40 determines whether it has reached the end of the low priority queue 50. At 312, if the controller 40 has not reached the end of the low priority queue 50, the controller proceeds to 334 and goes to the next entry in the low priority queue 50. The controller 40 then loops back to 326 and again compares the RV BSM sample age of the current entry to the low priority sample age threshold.

At 332, if the controller 40 has reached the end of the low priority queue 48, the controller proceeds to 336 and ends the method 320.

The method 320 for processing the low priority queue 50 is performed periodically in accordance with the low priority process time, such as 1,000 ms. In other words, the controller 40 can execute the method 320 for processing the high priority queue 48 once every 1,000 ms or at a cycle rate of 1 Hz. In addition, method 320 can be performed asynchronously, and in parallel with, method 200 related to placing the RV BSMs in the high and low priority queues. Put another way, the controller 40 can place the RV BSMs it the high and low priority queues, according to method 200, asynchronously with the processing of the RV BSMs from the high priority queues, according to methods 300 and 320.

Figure 5:
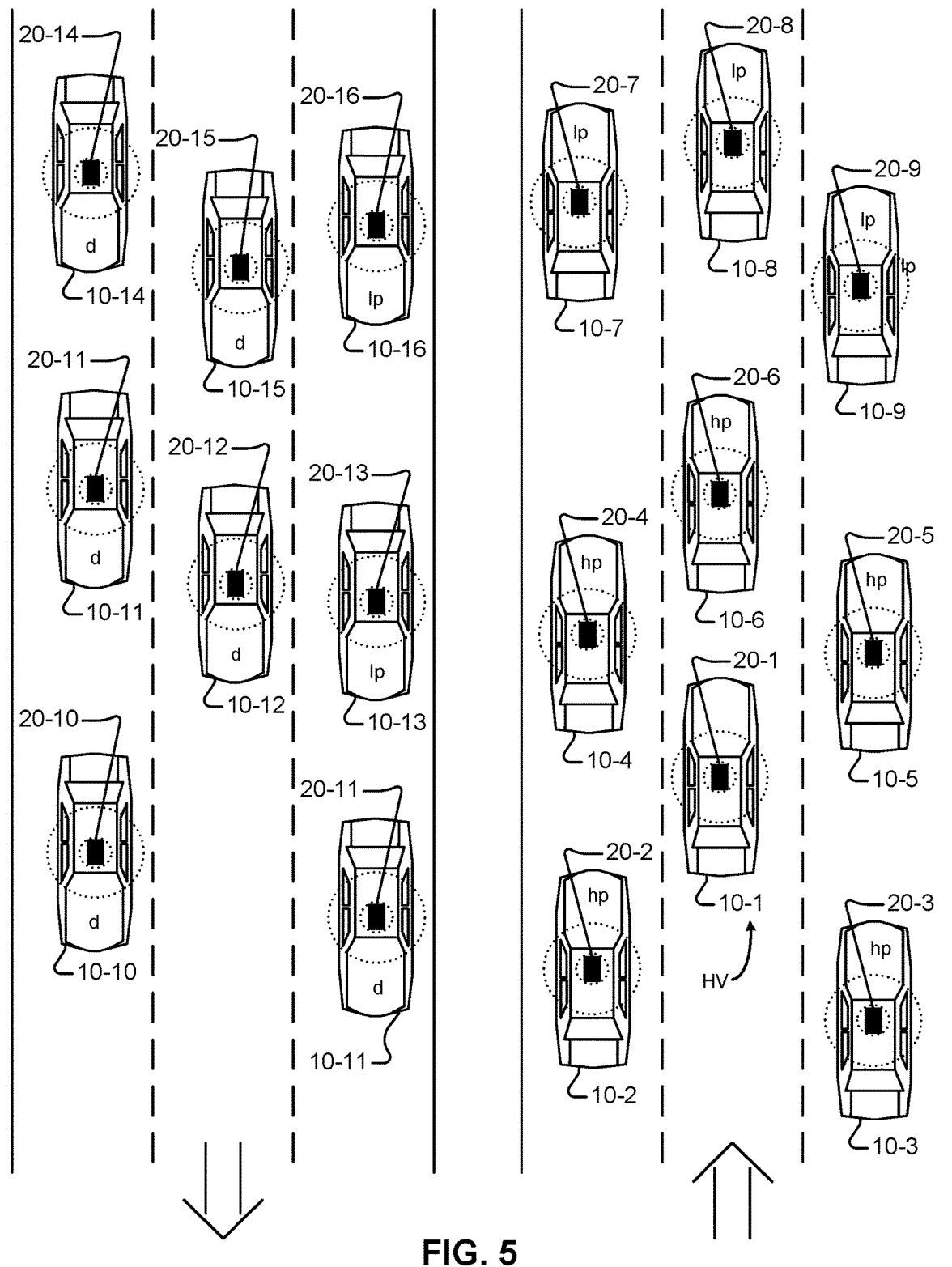
FIG. 5 is an illustration of several vehicles with vehicle communications systems in an example urban environment.

With reference to FIG. 5, a plurality of vehicles 10-1 to 10-16 with V2X communication systems 20-1 to 20-16 are shown. In the example embodiment, vehicle 10-1 is designated and referred to as the host vehicle HV 10-1 and vehicles 10-2 to 10-16 are designated and referred as remote vehicles RVs. The HV 10-1 and the RVs 10-2 to 10-16 are collectively referred to as vehicles 10 or singularly/generically as vehicle 10. The HV 10-1 and RVs 10-2 to 10-16 are respectively equipped with corresponding vehicle communication radio systems 20-1 to 20-16. The vehicle communication radio systems 20-1 to 20-15 are collectively referred to as vehicle communication radio systems 20 or singularly/generically as vehicle communication radio system 20.

The example of FIG. 5 shows an embodiment with six lanes of traffic, including three lanes of traffic traveling in the same direction as the HV 10-1 and three lanes of traffic traveling in the opposite direction as the HV 10-1. To illustrate the concepts of the present disclosure, in the example of FIG. 5, the vehicles have been labeled as "hp," "lp," or "d." In this example, the vehicles labeled as "hp" have been categorized in the high priority queue 48 based on the filter criteria and the vehicles labeled as "lp" have been categorized in the low priority queue 48 based on the filter criteria. The vehicles labeled as "d" have not been categorized in one of the queues and, as such, messages from those vehicles would be discarded. In the example of FIG. 5, the high priority queue 48 and the low priority queue 50 each have five slots for RVs.

With reference to FIG. 5, the five RVs surrounding the HV, i.e., 20-1 to 20-6 have been categorized in the high priority queue 48 and are labeled as "hp." Additionally, the next three vehicles traveling ahead of the HV, i.e., 20-7 to 20-9, have been categorized in the low priority queue 50 and are labeled as "lp." Additionally, the two closest vehicles to the RV that are traveling in the opposite direction, i.e., 20-11 and 20-13, are also categorized in the low priority queue and are labeled as "lp." The remaining vehicles, i.e., 20-10, 20-11, 20-12, and 20-14 to 20-16, are not categorized in one of the queues and messages from those vehicles would be discarded.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A communication system for a vehicle comprising:
a memory storing a high priority queue and a low priority queue, the high priority queue storing a plurality of first communication messages from a plurality of first remote vehicles in communication with the vehicle and the low priority queue storing a plurality of second communication messages from a plurality of second remote vehicles in communication with the vehicle; and
a controller configured to:
determine a transmit rate for transmitting third communication messages from the vehicle based on a determination of whether the vehicle is in a congested traffic situation, the transmit rate being set at a predetermined maximum transmit rate when the vehicle is not in the congested traffic situation and at a reduced transmit rate that is less than the predetermined maximum transmit rate when the vehicle is in the congested traffic situation;
receive a communication message from a remote vehicle;
apply a filter criteria to the communication message from the remote vehicle;
store the communication message in one of the high priority queue or the low priority queue based on applying the filter criteria;
process and decode the plurality of first communication messages in the high priority queue at a first processing rate by using a high priority process time period such that one first communication message from the plurality of first communication messages is processed per each high priority process time period, the first processing rate corresponding to the predetermined maximum transmit rate; and
process and decode the plurality of second communication messages in the low priority queue at a second processing rate by using a low priority process time period such that one second communication message from the plurality of second communication messages is processed per each low priority process time period;
wherein the first processing rate is higher than the second processing rate and the high priority process time period is less than the low priority process time period.

2. The communication system of claim 1, wherein the controller is further configured to:
add the communication message to the high priority queue in response to the communication message meeting the applied filter criteria and the remote vehicle being closer to the vehicle than at least one first remote vehicle from the plurality of first remote vehicles.

3. The communication system of claim 1, wherein the controller is further configured to:
add the communication message to the low priority queue in response to the communication message meeting the applied filter criteria and the remote vehicle not being closer to the vehicle than at least one first remote vehicle from the plurality of first remote vehicles.

4. The communication system of claim 1, wherein the controller is further configured to apply the filter criteria by:
   determining whether at least one predetermined indexed data field of the communication message contains valid data; and
   determining that the communication message meets the applied filter criteria when the at least one predetermined indexed data field of the communication message contains valid data.

5. The communication system of claim 1, wherein the controller is further configured to apply the filter criteria by:
   determining a difference in elevation between the vehicle and the remote vehicle;
   comparing the difference in elevation to an elevation threshold; and
   determining that the communication message meets the applied filter criteria when the difference in elevation is less than the elevation threshold.

6. The communication system of claim 1, wherein the controller is further configured to apply the filter criteria by:
   determining a distance between the vehicle and the remote vehicle;
   comparing the distance to a distance threshold;
   determining a rate at which the distance between the vehicle and the remote vehicle is changing;
   comparing the rate to a rate threshold; and
   determining that that the communication message meets the applied filter criteria when the distance is less than the distance threshold and the rate is greater than the rate threshold.

7. The communication system of claim 1, wherein the controller is further configured to apply the filter criteria by:
   comparing a location of the remote vehicle with a bounding box of the vehicle, the bounding box including a predetermined rectangular area surrounding the vehicle; and
   determining that the communication message meets the applied filter criteria when the remote vehicle is located within the bounding box.

8. The communication system of claim 1, wherein, in response to storing the communication message in the high priority queue, the controller is further configured to:
   determine whether the low priority queue contains an additional communication message from the remote vehicle; and
   delete the additional communication message from the remote vehicle from the low priority queue.

9. The communication system of claim 1, wherein the controller is further configured to:
   communicate contents of the communication message to at least one vehicle system controller of the vehicle, the vehicle system controller controlling a warning system of the vehicle; and
   wherein the vehicle system controller is configured to control the warning system of the vehicle based on the contents of the communication message.

10. The communication system of claim 1, wherein the controller is further configured to:
    communicate contents of the communication message to at least one vehicle system controller of the vehicle, the vehicle system controller controlling at least one of a braking system, a steering system, a throttle system, a transmission system, and a lighting system; and
    wherein the vehicle system controller is configured to control the at least one of the braking system, the steering system, the throttle system, the transmission system, and the lighting system of the vehicle based on the contents of the communication message.

11. A method comprising:
    receiving, with a controller of a communication system for a vehicle, a communication message from a remote vehicle, the communication system including a memory storing a high priority queue and a low priority queue, the high priority queue storing a plurality of first communication messages from a plurality of first remote vehicles in communication with the vehicle and the low priority queue storing a plurality of second communication messages from a plurality of second remote vehicles in communication with the vehicle;
    determining, with the controller, a transmit rate for transmitting third communication messages from the vehicle based on a determination of whether the vehicle is in a congested traffic situation, the transmit rate being set at a predetermined maximum transmit rate when the vehicle is not in the congested traffic situation and at a reduced transmit rate that is less than the predetermined maximum transmit rate when the vehicle is in the congested traffic situation;
    applying, with the controller, a filter criteria to the communication message from the remote vehicle;
    storing, with the controller, the communication message in one of the high priority queue or the low priority queue based on applying the filter criteria;
    processing and decoding, with the controller, the plurality of first communication messages in the high priority queue at a first processing rate by using a high priority process time period such that one first communication message from the plurality of first communication messages is processed per each high priority process time period, the first processing rate corresponding to the predetermined maximum transmit rate; and
    processing and decoding, with the controller, the plurality of second communication messages in the low priority queue at a second processing rate by using a low priority process time period such that one second communication message from the plurality of second communication messages is processed per each low priority process time period;
    wherein the first processing rate is higher than the second processing rate and the high priority process time period is less than the low priority process time period.

12. The method of claim 11, further comprising:
    adding, with the controller, the communication message to the high priority queue in response to the communication message meeting the applied filter criteria and the remote vehicle being closer to the vehicle than at least one first remote vehicle from the plurality of first remote vehicles.

13. The method of claim 11, further comprising:
    adding, with the controller, the communication message to the low priority queue in response to the communication message meeting the applied filter criteria and the remote vehicle not being closer to the vehicle than at least one first remote vehicle from the plurality of first remote vehicles.

14. The method of claim 11, wherein applying the filter criteria includes:
    determining, with the controller, whether at least one predetermined indexed data field of the communication message contains valid data; and determining, with the controller, that the communication message meets the applied filter criteria when the at least one predetermined indexed data field of the communication message contains valid data.

15. The method of claim 11, wherein applying the filter criteria includes:
   determining, with the controller, a difference in elevation between the vehicle and the remote vehicle;
   comparing, with the controller, the difference in elevation to an elevation threshold; and
   determining, with the controller, that the communication message meets the applied filter criteria when the difference in elevation is less than the elevation threshold.

16. The method of claim 11, wherein applying the filter criteria includes:
   determining, with the controller, a distance between the vehicle and the remote vehicle;
   comparing, with the controller, the distance to a distance threshold;
   determining, with the controller, a rate at which the distance between the vehicle and the remote vehicle is changing;
   comparing, with the controller, the rate to a rate threshold; and
   determining, with the controller, that that the communication message meets the applied filter criteria when the distance is less than the distance threshold and the rate is greater than the rate threshold.

17. The method of claim 11, wherein applying the filter criteria includes:
   comparing, with the controller, a location of the remote vehicle with a bounding box of the vehicle, the bounding box including a predetermined rectangular area surrounding the vehicle; and
   determining, with the controller, that the communication message meets the applied filter criteria when the remote vehicle is located within the bounding box.

18. The method of claim 11, wherein, in response to storing the communication message in the high priority queue, the method further comprises:
   determining, with the controller, whether the low priority queue contains an additional communication message from the remote vehicle; and
   deleting, with the controller, the additional communication message from the remote vehicle from the low priority queue.

19. The method of claim 11, further comprising:
   communicating, with the controller, contents of the communication message to at least one vehicle system controller of the vehicle, the vehicle system controller controlling a warning system of the vehicle; and
   controlling, with the vehicle system controller, the warning system of the vehicle based on the contents of the communication message.

20. The method of claim 11, further comprising:
   communicating, with the controller, contents of the communication message to at least one vehicle system controller of the vehicle, the vehicle system controller controlling at least one of a braking system, a steering system, a throttle system, a transmission system, and a lighting system; and
   controller, with the vehicle system controller, at least one of the braking system, the steering system, the throttle system, the transmission system, and the lighting system of the vehicle based on the contents of the communication message.

* * * * *

UNITED STATES PATENT AND TRADEMARK OFFICE
CERTIFICATE OF CORRECTION

PATENT NO. : 10,475,344 B2
APPLICATION NO. : 16/045588
DATED : November 12, 2019
INVENTOR(S) : Joe Stinnett It is certified that error appears in the above-identified patent and that said Letters Patent is hereby corrected as shown below:

Column 19, Line 31: In Claim 6, delete "that that" and insert --that-- therefor

Column 21, Line 26: In Claim 16, delete "that that" and insert --that-- therefor Signed and Sealed this
Third Day of March, 2020

Andrei Iancu
*Director of the United States Patent and Trademark Office*